Aug. 31, 1965 W. R. THOMAS 3,203,168
METHOD AND APPARATUS FOR IMPROVING THE PURIFICATION OF
EXHAUST GASES FROM AN INTERNAL COMBUSTION ENGINE
Filed May 21, 1962

INVENTOR.
WILLIAM R. THOMAS

BY

ATTORNEYS 3,203,168
METHOD AND APPARATUS FOR IMPROVING THE PURIFICATION OF EXHAUST GASES FROM AN INTERNAL COMBUSTION ENGINE
William R. Thomas, Paoli, Pa., assignor to Oxy-Catalyst, Inc., Berwyn, Pa., a corporation of Pennsylvania
Filed May 21, 1962, Ser. No. 196,260
4 Claims. (Cl. 60—30)

This invention relates to an improvement in method and apparatus for the purification of exhaust gases from an internal combustion engine and more particularly relates to such an improvement employed with a catalytic exhaust purifier generally in an automobile.

It is well known to employ an exhaust purifier containing an oxidation catalyst to purify exhaust gases from internal combustion engines operating on gasoline, generally leaded gasoline, to oxidize the oxidizable constituents of the exhaust gases and thus purify such gases. While such catalytic exhaust purifiers have been very markedly improved in recent years, they are somewhat deficient under adverse circumstances with respect to bringing the catalyst up to its operating temperature from a cold start.

Even after the catalyst has been brought up to its operating temperature, normally from 800° F. to 1400° F. it may then drop below the satisfactory operating range due to adverse conditions when the interrelationship of the heat supplied to the catalyst bed by the exhaust gases and the heat loss from the catalyst is relatively unfavorable. Such adverse conditions occur, for example, when the heat loss from the exhaust system is markedly increased by adverse driving conditions such as occur when driving an automobile through heavy water or slush or when the condition of the exhaust gases delivered by the engine, such as at idling, are unfavorable to maintaining the operating temperature of the catalyst.

It is, therefore, the object of this invention to provide means for supplying additional heat to the exhaust system to accelerate the bringing of the caalyst to an operating temperature from a cold start and to insure that the catalyst temperature is promptly returned to a temperature within its operating range of temperatures should the temperature of the catalyst drop below this range during the operation of the engine.

Figure 1:
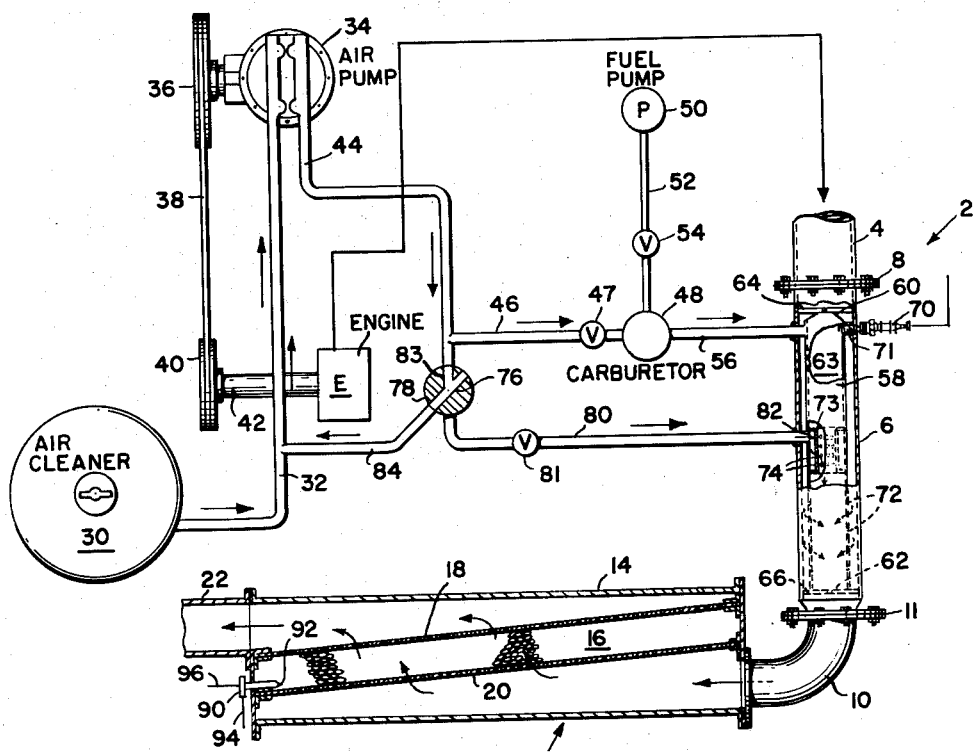
Figure 2:
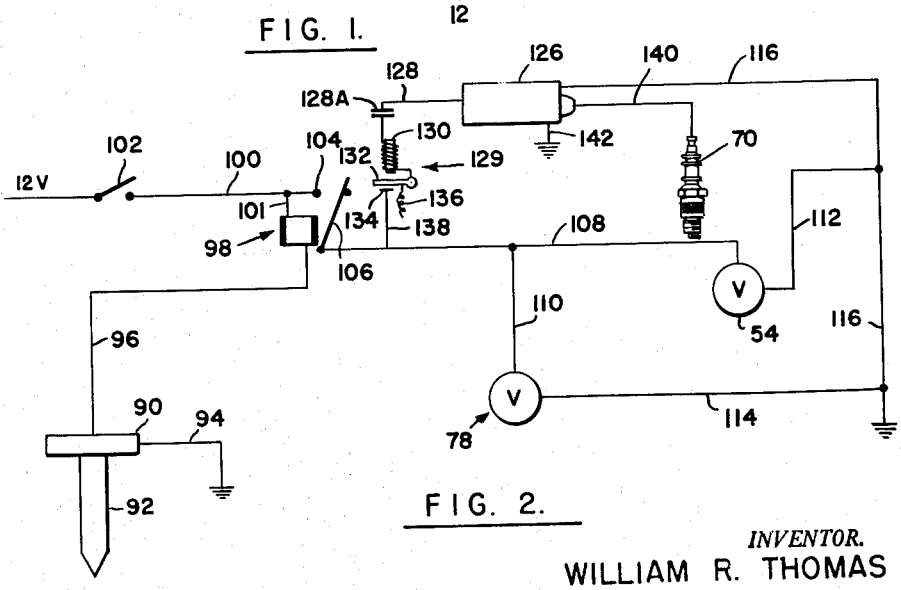

It is a further object of this invention to provide means whereby the amount of heat supplied to the exhaust system for heating the catalyst bed increases as engine speed increases. These and other objects of this invention will become apparent on reading the following description in conjunction with the drawings in which:

FIGURE 1 is a partially schematic view of apparatus in accordance with this invention for adding heat to the exhaust system; and FIGURE 2 is a schematic wiring diagram of the control circuit for the apparatus in FIGURE 1.

Referring now to FIGURE 1, a conventional exhaust system 2 has a pipe 4 which is connected to the exhaust manifold (not shown) of a gasoline internal combustion engine E and is flanged to pipe 6 at 8. Pipe 6 in turn is flanged to pipe 10 at 11. Pipe 10 is connected to and discharges into exhaust purifier 12 which has a casing 14 containing an oxidation catalyst pellet sloping bed 16 which is confined between opposed grids 18 and 20. Exhaust purifier 12 discharges into a tail pipe 22.

The above-described exhaust system containing an oxidation catalyst exhaust purifier is known to the art. Typical oxidation catalyst exhaust purifiers are shown in Houdry Patent No. 2,828,189 issued March 25, 1958; Houdry Patent No. 2,776,875 issued January 8, 1957, and Karol et al. Patent No. 2,853,367 issued September 23, 1958, and the sloping bed oxidation catalyst exhaust purifier specifically shown is disclosed in Eugene J. Houdry Patent application Serial No. 836,178, filed on August 26, 1959. The catalyst employed may be for example, a pellet of an activated metal oxide, preferably activated alumina, beryllia, thoria, magnesia or zirconia impregnated with metals or metal oxides having oxidation activity such as platium, palladium, ruthenium, rhodium, copper, silver, chromium, vanadium, manganese iron or mixtures thereof such as copper and chromium oxides.

The novel features of apparatus in accordance with this invention will now be described. Air from an air cleaner 30 which may be a separate unit or the air cleaner employed with the carburetor for the engine is drawn through pipe 32 by a diaphragm pump 34 which is driven by a pulley 36. Pulley 36 is, in turn driven by belt 38 driven by a pulley 40 connected to cam shaft 42 of piston gasoline engine E. Air from pump 34 is pumped through pipe 44 into pipe 46 which is provided with a rate control valve 47 and which delivers the air to a venturi type carburetor 48. Carburetor 48 is supplied with fuel, generally leaded gasoline, by a fuel pump 50 which may be a separate unit or may be the fuel pump employed to supply the engine carburetor. Pump 50 is connected to carburetor 48 by pipe 52 which is controlled by a rotary solenoid valve 54. A combustible air fuel mixture is carried from carburetor 48 through conduit 56 to discharge into the interior of a casing 58 having a closed end 60 and an open end 62, casing 58 forming a combustion chamber 63. Casing 58 is cylindrical having a diameter less than the diameter of pipe 6 to permit the passage of exhaust gases between the casing and pipe 6 and is secured in posiion by a pair of spiders 64 and 66. A spark plug 70 passes through pipe 6 and is secured in boss 71 adjacent closed end 60 to supply a spark to the interior of casing 58. A substantial proportion of the casing 58 adjacent open end 62 is supplied with small openings 72 to make this end of the casing perforate.

A circular ring member 73 forms a manifold with casing 58 and is provided with opening 74 above its inner periphery for discharge of air into the combustion chamber 63.

Air is also supplied through pipe 44 and passage 76 in rotary solenoid valve 78 to line 80 which has a rate control valve 81 when an air fuel mixture is being supplied to casing 58. Line 80 discharges into the interior of ring member 73 through opening 82. Valve 78 is also provided with a passage 83 connecting with passage 76 which is employed to deliver air from line 44 to pipe 84 rather than to pipe 80 when an air-fuel mixture is not being supplied to the interior of casing 58.

Preferably valve 47 and 81 are set so that line 46 will deliver air at about double the rate of line 80 to provide a rich initial air fuel mixture which can be readily ignited and yet provide sufficient total air for substantially complete combustion.

Referring now to the wiring diagram of FIGURE 2 in conjunction with FIGURE 1, a thermo switch 90 has a sensing element 92 which is embedded within catalyst bed 16. Sensing element 92 is preferably located between the inlet grid 20 and the middle of the catalyst bed and advantageously is located relatively close to the inlet grid to detect a predetermined drop in temperature since this portion of the bed will cool down more rapidly than the portion of the bed more remote from the inlet grid. Switch 90 is connected to ground through line 94 and connected through line 96 to a relay 98. Relay 98 is connected to 12-volt power line 100 by line 101. Line 100 contains a switch 102 which may conveniently be the starting key switch of the engine. Line 100 is connected to contact 104 of relay 98. Switch arm 106 of relay 98 engages contact 104 when relay 98 is energized and connects line 100 to line 108 which in turn is connected to rotary solenoid switch 54. Line 110 connects rotary solenoid switch 78 to line 108. Switches 54 and 78 are respectively connected to line 116 by lines 112 and 114; line 116 being connected to ground.

Ignition coil 126 has one end of its primary winding connected to ground line 116 and the other end connected to line 128 containing condenser 128A which is part of an interrupter 129. Line 128 is coiled about a magnetizable coil 130 and connected to magnetizable pivoted switch arm 132. Arm 132 is biased into contact with contact 134 by spring 136. Line 138 connects line 108 to contact 134. The secondary coil delivers a high voltage current through line 140 to spark plug 70 and is connected to ground by line 142.

*Operation*

In operation, thermo switch 90 remains closed until the temperature of the catalyst bed 16 reaches the low end of the operating range of, for example 800° F.–1400° F. Thus when switch 102 is closed as by the ignition key, relay 98 is energized causing switch arm 106 to connect line 100 to line 108 which in turn results in energizing rotary solenoid valves 54 and 78. On being energized, valve 54 is opened permitting the flow of fuel to carburetor 48. The energizing of valve 78 causes the valve to turn from the position in which it is shown in FIGURE 1 to place channel 76 so as to connect pipes 44 and 80. The energizing of line 108 also energizes interrupter 129 and coil 126 to provide a repeated spark to be made in the interior of casing 58 by spark plug 70.

When the engine in association with which the exhaust system is being employed is started up, cam shaft 42 rotates pulley 40 causing belt 38 to drive pulley 36 and actuate diaphragm air pump 34 to supply primary air to carburetor 48 which mixes the air with fuel, for example, gasoline which is then introduced through line 56 into the interior of casing 58 in a combustible mixture which is ignited by spark plug 70. From line 80 secondary air is supplied to interior of ring member 73 for flow into the interior of casing 58 through openings 74 to cause additional air to be mixed with the uncombusted fuel in combustion chamber 63 for completing the combustion of the fuel. The air supplied in this manner also supplies air in an amount over and above that required to complete the said combustion to provide for sufficient air the oxidation of the oxidizable constituents in the exhaust gases, a portion of which will be oxidized as a portion of the exhaust gases pass through openings 72 in casing 58 and the remaining portion of which will be oxidized in the catalyst bed 16 after it is brought up to operating temperature by the combined heat supplied by the exhaust gases and the heat provided by the combustion in casing 58. Openings 72 prevent exhaust gases from entering chamber 63 in an amount large enough to quench burning in the chamber and by causing the progressive heating of those gases permits the use of the heat generated by the burning of the earlier admitted gases to promote the burning of the later admitted gases. The gases flowing from the discharge end 62 of casing 58 are mixed with the exhaust gases which have flowed between the walls of pipe 6 and casing 58 and past spider 66 and the mixed gases flow through pipe 10 into purifier 12 and then through catalyst bed 16 to heat it and thence to tail pipe 22 for discharge to the atmosphere.

When the catalyst bed 16 reaches a predetermined temperature within its operating range, thermo switch 90 opens de-energizing relay 98 causing switch arm 106 to open the circuit from line 100 to line 108. This results in de-energizing spark plug 70 and valves 54 and 78. When valve 54 is de-energized, it returns to its closed position shutting off the supply of fuel to carburetor 48. It will be noted that air continues to flow through carburetor 48 and thence into the interior of casing 58. Since no fuel is supplied, the sole function of this air is to supply air for mixture with the exhaust gases from the engine in order that there may be sufficient air present for the oxidation of the oxidizable constituents of the exhaust gases by the oxidation catalyst in the exhaust purifier 12.

The de-energizing of valve 78 causes the valve to return to the position shown in FIGURE 1 with passage 80 lined up with pipe 44 and passage 76 lined up with pipe 84 in order to by-pass the air previously introduced into pipe 80 back through pipe 84 and pipe 32 to pump 34. This operation prevents introducing air over and above that required for the oxidation of the oxidizable constituents of the exhaust gases from the engine by the exhaust purifier 12.

Should the temperature of the catalyst bed 16 now drop down below the desired minimum operating temperature at which thermo switch 90 is set, switch 90 will again be closed with the result that the combustion inside of casing 58 will be resumed until the bed temperature again is brought back up to the desired temperature.

It will be noted that during the period when combustion is occurring within casing 58, the faster the engine runs, the greater will be the delivery of air to the carburetor 48 and through pipe 80 since pump 34 is driven by the engine and hence the greater will be the rate of new fuel and exhaust gas combustibles combusted within casing 58. Thus, as the engine speed increases with the resultant increase in rate of flow of its exhaust gases, the rate of heat addition to the exhaust gases by the apparatus and method of this invention increases also. Since the temperature of exhaust gases from a gasoline engine increases with engine speed, it is desirable to have the air-fuel mixture supplied to combustion chamber 63 with a diminishing ratio of air-fuel mixture mass to exhaust gas mass as engine speed increases, in order to compensate for the increased temperature of the exhaust gases discharged by the engine and prevent the temperature of the gases delivered to the catalyst from exceeding a temperature which would damage the catalyst and purifier structure parts, for example 1600° F. A diaphragm pump, for example, accomplishes this result due to its inherent characteristic of becoming less efficient as its speed is increased.

What is claimed is:

1. In combination with an engine having an exhaust system provided with an exhaust pipe for conveying exhaust gases from the engine and an exhaust purifier containing an oxidation catalyst for the oxidation of the oxidizable constituents of the exhaust gases into which the exhaust pipe discharges, the improvement comprising a casing having an open end and forming a combustion chamber secured with said exhaust pipe with the open end at the downstream end of the casing, a carburetor, a fuel line connected to said carburetor, air supply means connected to said carburetor, means to convey an air fuel mixture from the carburetor to the combustion chamber, means to ignite said air fuel mixture in the combustion chamber, a line connected to said air supply means and connected to the combustion chamber downstream of the connection of the air fuel mixture conveying means to the combustion chamber to supply secondary air to the combustion chamber and air for oxidation of oxidizable constituents in the exhaust gases by the oxidation catalyst, means responsive to a predetermined minimum temperature of the oxidation catalyst to stop the flow of fuel through the fuel line to the carburetor and to stop the flow of air through said line connected to said air supply means.

2. The combination of claim 1 in which the air supply means delivers air at a rate which increases as engine speed increases.

3. The combination of claim 1 in which the air supply means delivers air at a rate which increases as engine speed increases and which causes the ratio of the air fuel mixture mass to the exhaust gas mass to decrease as engine speed increases.

4. In combination with an engine having an exhaust system provided with an exhaust pipe for conveying exhaust gases from the engine and an exhaust purifier containing an oxidation catalyst for the oxidation of the oxidizable constituents of the exhaust gases into which the exhaust pipe discharges, the improvement comprising a casing forming a combustion chamber discharging into said exhaust pipe, said casing lying entirely within said exhaust pipe and spaced therefrom to permit the passage of exhaust gases between the casing and the exhaust pipe and having a closed end facing upstream, an open discharge end facing downstream and perforations adjacent the discharge end for the gradual admission of exhaust gases into the combustion chamber, a carburetor, a fuel line connected to said carburetor, air supply means connected to said carburetor, means to convey an air fuel mixture from the carburetor to the combustion chamber, means to ignite said air fuel mixture in the combustion chamber, a line connected to said air supply means and connected to the combustion chamber downstream of the connection of the air fuel mixture conveying means to the combustion chamber to supply secondary air to the combustion chamber and air for the oxidation of oxidizable constituents in the exhaust gases by the oxidation catalyst, means responsive to a minimum temperature of the oxidation catalyst to stop the flow of fuel to the combustion chamber and to reduce the flow of air to the combustion chamber by substantially the amount required to combust said fuel.

References Cited by the Examiner

UNITED STATES PATENTS

| 1,605,484 | 11/26 | Thompson et al. | |
| 1,875,024 | 8/32 | Kryzanowsky | 60—30 X |
| 2,851,852 | 9/58 | Cornelius | 60—30 |
| 2,937,490 | 5/60 | Calvert | 60—30 |
| 2,956,865 | 10/60 | Williams | 60—30 X |

FOREIGN PATENTS 757,871  9/56  Great Britain.

JULIUS E. WEST, *Primary Examiner.*